United States Patent [19]

Yamada et al.

[11] Patent Number: 4,917,851
[45] Date of Patent: Apr. 17, 1990

[54] METHOD OF MANUFACTURING MULTI-LAYER RESIN MATERIAL

[75] Inventors: Toyokazu Yamada, Chiba; Masao Miyama, Ichihara; Hideo Sugimura, Kisarazu; Takeshi Shinohara, Chiba, all of Japan

[73] Assignee: Idemitsu Petrochemical Co., Ltd., Tokyo, Japan

[21] Appl. No.: 866,187

[22] Filed: May 22, 1986

[30] Foreign Application Priority Data

Jun. 10, 1985 [JP] Japan .................... 60-125930

[51] Int. Cl.⁴ .................. B29C 47/06; B29C 47/12; B29C 47/92; B32B 31/30
[52] U.S. Cl. .................. 264/40.7; 264/37; 264/171; 264/211; 264/DIG. 69; 425/131.1; 425/133.5; 425/145; 425/146; 425/462
[58] Field of Search ............ 264/37, 171, DIG. 69, 264/40.7, 211; 425/131.1, 133.5, 462, 466, 146, 145

[56] References Cited

U.S. PATENT DOCUMENTS

| | | | |
|---|---|---|---|
| 3,398,431 | 8/1968 | Corbett | 425/133.5 |
| 4,208,175 | 6/1980 | Rosenbaum | 425/131.1 |
| 4,337,298 | 6/1982 | Karim et al. | 264/171 X |
| 4,348,346 | 9/1982 | Thompson | 264/171 X |
| 4,443,397 | 4/1984 | Hahn et al. | 264/171 |
| 4,476,080 | 10/1984 | Komoda et al. | 264/37 X |
| 4,483,812 | 11/1984 | Hahn et al. | 264/171 |
| 4,533,510 | 8/1985 | Nissel | 264/171 |

FOREIGN PATENT DOCUMENTS

| | | | |
|---|---|---|---|
| 49-5738 | 1/1974 | Japan . | |
| 50-16388 | 6/1975 | Japan . | |
| 55-28825 | 2/1980 | Japan | 264/171 |
| 55-90327 | 7/1980 | Japan | 264/171 |
| 57-26216 | 6/1982 | Japan . | |
| 58-3809 | 1/1983 | Japan . | |
| 59-1179 | 1/1984 | Japan . | |
| 60-198226 | 10/1985 | Japan | 264/171 |
| 2075914 | 11/1981 | United Kingdom | 264/171 |
| 2137935 | 10/1984 | United Kingdom | 264/171 |

Primary Examiner—Jeffery Thurlow
Assistant Examiner—Leo B. Tentoni
Attorney, Agent, or Firm—Flynn, Thiel, Boutell & Tanis

[57] ABSTRACT

A method of manufacturing a multi-layer resin material by employing a plurality of kinds of thermoplastic resin. Resins for inner and outer layers are supplied into a feed block of a feed block type T-die coextrusion apparatus where they are laid up another, and are then sent to the T-die side. In this case, a resin which is practically similar to the resin for the outer layer is supplied as an auxiliary resin to both lateral edges of the multi-layer resins within the feed block. Thus, the sheet extruded from the T-die slit has lateral edges which are made of a single resin.

10 Claims, 4 Drawing Sheets

METHOD OF MANUFACTURING MULTI-LAYER RESIN MATERIAL

BACKGROUND OF THE INVENTION

1. Field of the Invention

The present invention relates to a method of manufacturing a multi-layer resin material such as a multi-layer resin sheet or film.

2. Description of the Prior Art

A multi-layer resin sheet or film has heretofore been produced by kneading and melting a plurality of different kinds of resins using a plurality of extrusion machines and then conjointly extruding the kneaded resins together from a die in the shape of a multi-layer structure. One example of known multi-layer resin materials is composed of an inner layer made of a gas barrier resin, for example, a resin having low oxygen permeability such as ethylene-vinyl alcohol copolymer, and an outer layer made of a polyolefin resin which may be bonded to the inner layer by means of an adhesive resin, if necessary.

In the manufacture of a multi-layer resin material, the thickness of each of the resin layers must be uniform over the entire width of the material, and it is also necessary to trim both lateral edges of the multi-layer resin material in order to obtain a product having a uniform thickness and width. When a multi-layer resin material is stretched using a tenter as a secondary stretching process, the edge portions of this material which are grasped by the chucks of the tenter are rejected as scrap. If the product is made of a single kind of resin, this scrap can be re-used by processing it through a scrap grinder. In the case of a multi-layer resin material, however, the scrap is a laminate of different kinds of resins which are united together over their entire widths, and it is, therefore, difficult to re-use that scrap. Multi-layer resin materials which are composed of resins that differ in heat resistance are particularly difficult to re-use and, therefore, involve the problem of wasteful use of resources and increases in costs.

In view of the above-described circumstances, there have already been proposed the following two methods as means for enabling a multi-layer material extruded from a die to have lateral edge portions which are virtually completely made of only an outer-layer resin: (1) the die is specially designed for the above-described purposes (disclosed in Japanese Patent Publication Nos. 5738/1974, 26216/1982, 3809/1983 and 1179/1984); and (2) an inner-layer resin is wrapped or encircled by an outerlayer resin within a feed block (disclosed in Japanese Patent Publication No. 26216/1982).

These proposed methods suffer, however, from the following disadvantages. With the method 1), the die structure is complicated, and it is not possible to satisfactorily cope with changes in the kinds of resins employed, the layer thickness ratio, operating conditions and so forth. With the method (2), it is difficult to make uniform the thickness distribution of each of the resin layers over the entire width and it is also difficult to satisfactorily form a single-resin layer at each lateral edge.

SUMMARY OF THE INVENTION

Accordingly, it is a primary object of the present invention to provide a method of manufacturing a multilayer resin material which enables the trimmings to be re-used, which does not require a complicated die structure, which permits each of the layers to have an accurately uniform thickness distribution over the entire width and which is also capable of coping with a wide range of changes in operating conditions.

To this end, the present invention provides a method of manufacturing a multi-layer resin material by extruding at least two different kinds of thermoplastic resins using a feed block-type T-die coextrusion apparatus, wherein an auxiliary resin is supplied to both lateral edges of the multi-layer resins in the terminating end section of the feed block so that the product extruded from the die outlet has lateral edges which are substantially completely made of a single resin.

More specifically, by supplying an auxiliary resin to both lateral edges of the multi-layer resins in the terminating end section of the feed block, the product extruded from the die outlet can have lateral edge portions which are virtually made of a single resin and without complicating the die structure. In addition, it is possible to make uniform the thickness distribution of each layer over the entire width of the product.

Since trimmings cut from the edge portions of the product are composed of a single resin, they can easily be re-used. As a result, it is possible to avoid wasteful use of resources and to reduce material costs. Since the thickness distribution of each layer in the widthwise direction of the product is uniform, no stress concentration occurs even when the product is stretched by a tenter as a secondary stretching process, and it is possible to obtain desired characteristics. In addition, it is possible to satisfactorily cope with changes in operating conditions.

DETAILED DESCRIPTION OF THE PREFERRED EMBODIMENT

Figure 1:
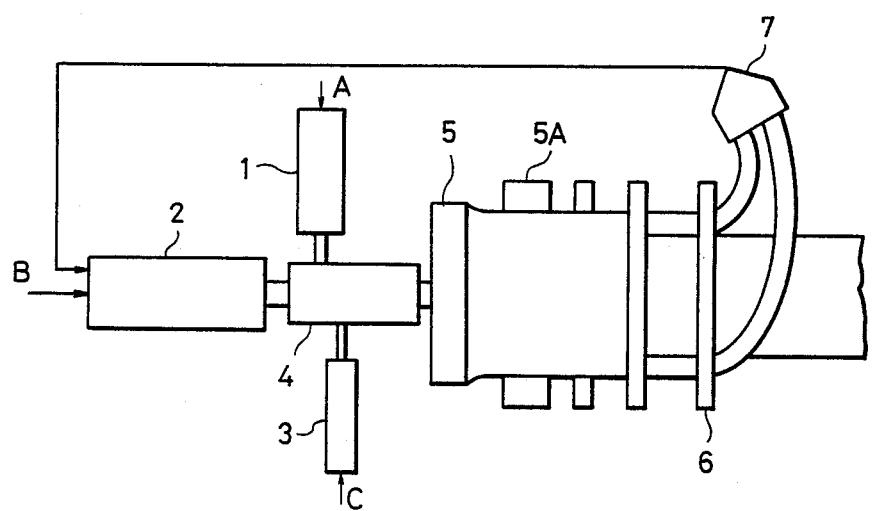
FIG. 1 shows an apparatus for manufacturing a multi-layer resin material to which the method of the present invention is applied.
Figure 3:
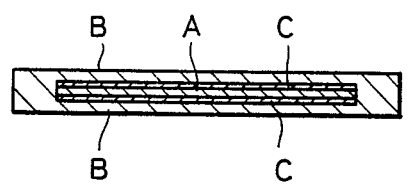
FIG. 3 is a sectional view of a multi-layer resin sheet obtained by the flow path arrangement shown in FIG. 2.

FIG. 1 shows a multi-layer resin material manufacturing apparatus to which the method of the present invention is applied. The apparatus is adapted to produce a multi-layer resin sheet composed of five layers and made of three kinds of resin, that is, an inner-layer resin A, an outer-layer resin B and an adhesive resin C, as shown in FIG. 3.

Referring to FIG. 1, the reference numeral 1 denotes a first extruder for the inner-layer resin A, 2 a second extruder for the outer-layer resin B, and 3 a third extruder for the adhesive resin C. The resins A, B and C which are respectively extruded by these extruders 1, 2 and 3 are sent to a feed block 4 where they are laid up one another as they move in the direction of the multi-layer resin material to be produced, and are then discharged in the shape of a multi-layer resin sheet from a slit of a T-die 5. The sheet thus discharged from the T-die 5 has its lateral edge portions trimmed off by a cutter 6, thereby shaping the sheet so as to have a predetermined width. The trimmings cut by the cutter 6 are ground up by a grinder 7 and then are sent to the second extruder 2 for re-use. The reference numeral 5A in FIG. 1 denotes a cooling roll.

Examples of resins which can be employed as the inner-layer resin A include ethylene-vinyl alcohol copolymers (a saponified ethylene-vinyl acetate copolymer), polyvinylidene chloride, polyvinyl chloride, polyvinyl chloride-vinylidene chloride copolymer, polyvinyl alcohol, polyamide resins and polyacrylonitrile resins.

As the outer-layer resin B, a polyolefin (polypropylene, polyethylene, an ethylene-α-olefin copolymer or a mixture thereof) can be employed.

In this case, 5 to 300 parts by weight of a filler, such as talc, calcium carbonate, silica or titanium oxide, can be added to 100 parts by weight of the resins selected to form a multi-layer resin material. It is also possible to add an oxidation inhibitor, an ultraviolet absorber, an antistatic agent, a lubricant and a coloring agent to each resin for each layer, according to need.

As the adhesive resin C, a modified polyolefin, an ionomer, etc. can be employed. Examples of modified polyolefins include polyolefins modified with unsaturated carboxylic acids or their derivatives, such as acrylic acid, methacrylic acid, maleic acid, fumaric acid, maleic anhydride, methyl acrylate, methyl methacrylate, maleic acid monoethyl ester, acrylamide, maleimide and sodium acrylate. The content of the unsaturated carboxylic acid or derivative in a selected modified polyolefin ranges from 0.001 to 15 wt %, preferably from 0.005 to 10 wt %. A blend of a modified polyolefin and an unmodified polyolefin which is the same as or different from this modified polyolefin can be employed.

Figure 2:
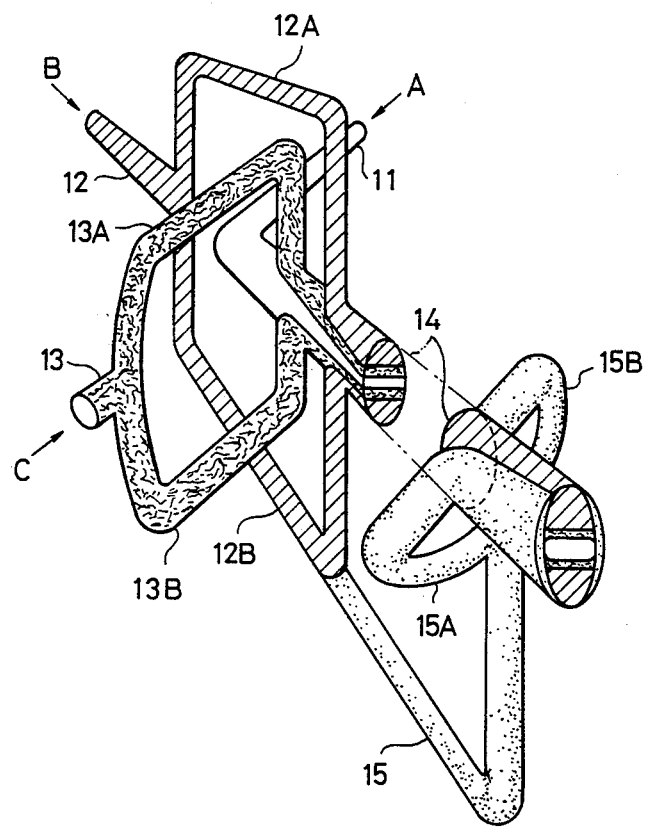
FIG. 2 is a perspective view showing the arrangement of flow paths formed in a feed block employed in the apparatus shown in FIG. 1.

FIG. 2 shows the resin flow paths which are formed inside the feed block 4. As illustrated, inside the feed block 4 are formed a first flow path 11 which communicates with the first extruder 1, a second flow path 12 communicating with the second extruder 2, and a third flow path 13 communicating with the third extruder 3.

The first flow path 11 extends straight toward one side of the feed block 4 and then, inside said feed block, it is bent at a right angle so as to extend toward the inlet of the T-die 5. The third flow path 13 extends toward the inside of the feed block 4 from the side thereof which is opposite to the side from which the first flow path 11 extends. The third flow path 13 is branched into upper and lower flow paths 13A and 13B that extend parallel to each other above and below the first flow path 11, and are then joined to the upper and lower sides, respectively, of the first flow path 11 on the input end of the feed block 4. The second flow path 12 extends toward the inside of the feed block 4 from an end thereof which is orthogonal to the sides from which the first and third flow paths 11 and 13 extend, respectively. The second flow path 12 is branched into upper and lower flow paths 12A and 12B that extend parallel to each other above and below the first flow path 11, and are then joined to the upper and lower sides, respectively, of the first and third flow paths 11 and 13 at a position which is slightly offset downstream (as viewed in the resin feed direction) from the position at which the first and third flow paths 11 and 13 join together.

An auxiliary flow path 15 communicates with the lower flow path 12B. The auxiliary flow path 15 extends parallel to the combined flow path 14 of the three different resins that were fed through the flow paths 11, 12 and 13 and then extends upwardly toward the flow path 14. The auxiliary flow path 15 is branched into flow paths 15A and 15B which extend toward opposite sides of the joint flow path 14, and are then joined to said opposite sides, respectively, of the flow path 14 in the terminating end section of the feed block 4, that is, at a position which immediately precedes the inlet of the die 5.

With this arrangement, the inner-layer resin A, the outer-layer resin B and the adhesive resin C are respectively supplied to the first, second and third flow paths 11, 12 and 13. In consequence, these resins A, B and C are laminated one upon another in the thickness direction to form a multi-layer resin material at the input end section of the feed block 4. The resin B, which serves as the auxiliary resin and which is supplied through the auxiliary flow path 15, is united to opposite sides of the multi-layer resin material in the terminating end section of the feed block 4, that is, at a position immediately preceding the inlet of the die 5.

The multi-layer resin material which has passed through the feed block 4 in this way is then extruded from the T-die 5 in the shape of a sheet and is discharged from the slit. The multi-layer resin sheet discharged from the T-die 5 has both lateral edges thereof cut by the cutter 6 so that said sheet has a predetermined width. The trimmings of the sheet cut by the cutter 6 are ground in the grinder 7 and then sent to the second extruder 2 for re-use. The trimmings consist essentially of the B resin.

Thus, according to this embodiment, an auxiliary resin is united to both lateral edges of the three laminated resins in the terminating end section of the feed block 4. It is therefore possible to obtain a multi-layer resin material whose lateral edges are virtually made of a single resin without complicating the structure of the die 5. Accordingly, the trimmings cut from the edges of the extruded multi-layer resin material can be re-used. As a result, it is possible to avoid wasteful use of resources and reduce production costs.

Since the thickness distribution of each layer is uniform over the entire width of the film or sheet product, no stress concentration occurs even when the product is stretched by a tenter as a secondary stretching process, so that a product having the desired characteristics can be obtained. In addition, there is no adverse effect on the product quality even when the operating conditions change.

This is clear from an experimental example in which a multi-layer resin sheet was actually produced by the apparatus shown in FIG. 1. In the experiment, an ethylene-vinyl alcohol copolymer (EVAL (registered trademark), EP-F101, manufactured by Kabushiki Kaisha Kurare, with an ethylene content of 32 mol % and a melt index of 1.3 g/10 min. was employed as the inner-layer resin A, a polypropylene resin (Idemitsu Polypro, E100G, manufactured by Idemitsu Petrochemical Co., Ltd. with a melt index of 0.6 g/10 min.) was employed as the outerlayer resin B and was also employed as the auxiliary resin, and a maleic anhydride-modified polypropylene (Idemitsu Polytac (registered trademark), E100, manufactured by Idemitsu Petrochemical Co., Ltd.) was employed as the adhesive resin C. These resins were melted and kneaded in the extruders 1, 2 and 3, respectively, and then were laminated one upon another to form a resin material with a multi-layer structure within the feed block 4. The multi-layer resin material was then extruded from the die 5 to obtain a sheet (a width of 600 mm) having five layers (see FIG. 3) and made of three different kinds of resin A, B and C.

The sheet trimmings were ground by the grinder 7, and the entire amount (about 15%) of the thereby obtained ground resin was mixed with the polypropylene resin as a raw material for re-use. The experiment showed that no defect occurred in the product sheet even after a continuous operation for 10 hours. In addition, each of the layers had an excellent uniform thickness distribution over the entire width of the product sheet.

Although the above-described embodiment exemplifies a method of manufacturing a multi-layer resin sheet having five layers and made of three different kinds of resin (see FIG. 3), the method of the present invention may widely be applied to the manufacture of a multi-layer resin sheet made of two or more kinds of thermoplastic resins.

Figure 4:
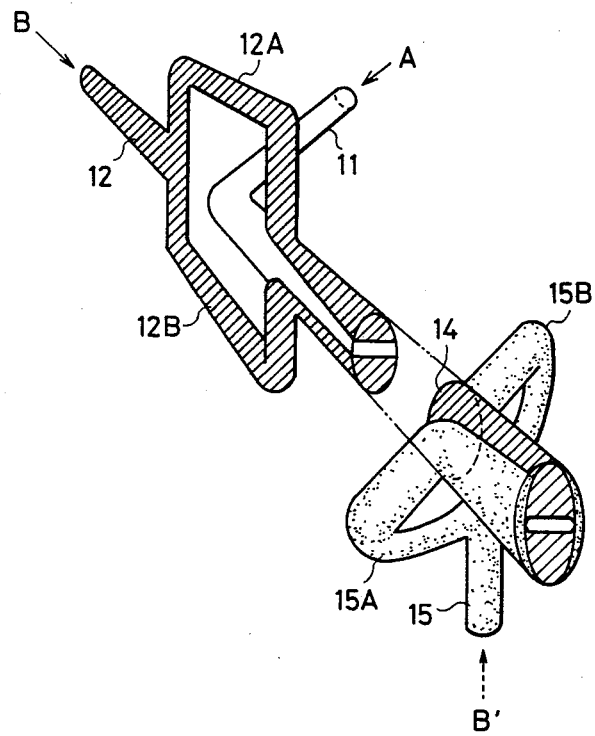
FIG. 4 is a perspective view showing another flow path arrangement for the feed block.
Figure 5:
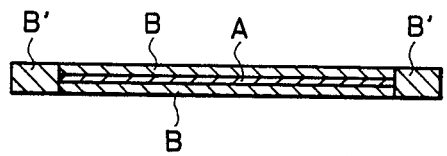
FIG. 5 is a sectional view of a multi-layer resin sheet obtained by the flow path arrangement shown in FIG. 4.

For example, employment of a feed block as shown in FIG. 4 enables manufacture of a multi-layer resin sheet having three layers consisting of two kinds of resin, such as that shown in FIG. 5. In the feed block shown in FIG. 4, the third flow path 13 is omitted, while the auxiliary flow path 15 communicates with the third extruder 13. A resin B' which is similar to the outerlayer resin B is supplied through the auxiliary flow path 15. This also provides advantageous effects similar to those offered by the above-described embodiment.

Figure 6:
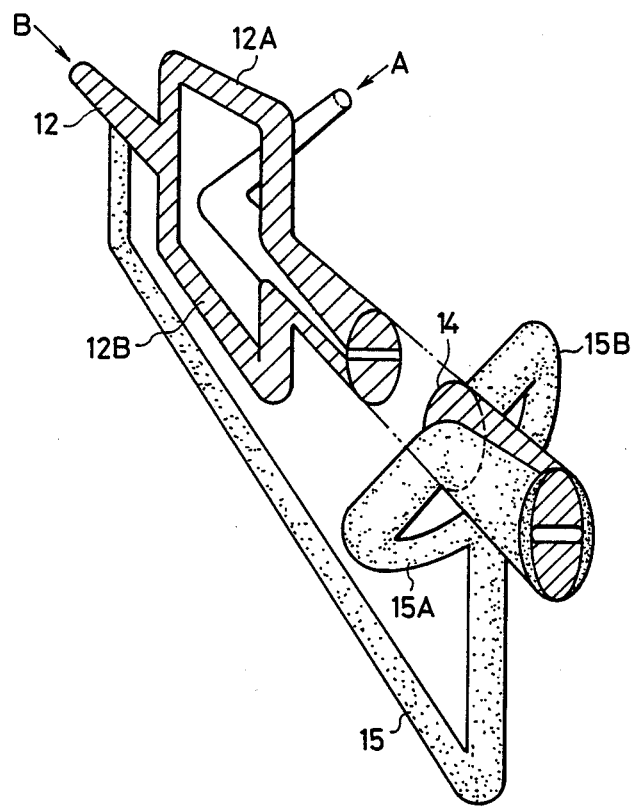
FIG. 6 is a perspective view of still another flow path arrangement for the feed block.
Figure 7:
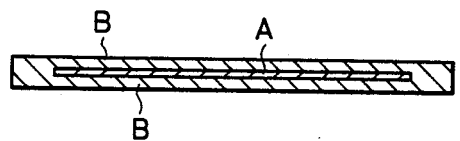
FIG. 7 is a sectional view of a multi-layer resin sheet obtained by the flow path arrangement shown in FIG. 6.

If the auxiliary flow path 15 communicates with the second flow path 12 at a position which is on the upstream side of the branching point of the flow path 12 as shown in FIG. 6, it is possible to obtain a multilayer resin sheet such as that shown in FIG. 7. This arrangement has the advantage that the third extruder 3 becomes unnecessary.

Although description of a means for appropriately adjusting the feed rate of each resin has not been made for the illustrated examples, the feed rate of each resin can be adjusted in a smooth uniform manner in accordance with the desired thickness thereof in the product. The feed rate of the resin which is supplied to the feed block 4 from the auxiliary flow path 15 can be controlled in accordance with the respective feed rates of the inner- and outer-layer resins. If a regulating valve or other similar means is provided at a desired position in the auxiliary flow path 15, the flow path 15 can be controlled independently of the flow paths for the inner- and outer-layer resins.

As has been described above, it is possible, according to the present invention, to provide a method of manufacturing a multi-layer resin material which enables trimmings of a product to be re-used without complicating the die structure and permits each layer to have a highly uniform thickness distribution over the entire width of the product and which is also capable of coping with changes in operating conditions over a wide range.

What is claimed is:

1. A method of manufacturing a multi-layer resin material having at least one inner layer and two outer layers, said method comprising the steps of:
    extruding at least two different kinds of thermoplastic resins from coextrusion apparatus and feeding the resins to a feed block, to form said multi-layer resin material, and thence to a T-die;
    joining through the same flow path as the resin for said outer layers an auxiliary resin, which is substantially the same as a resin for said outer layers, to both lateral edges of multilayer resins within the feed block of said coextrusion apparatus, said feed block having an input end section defined on the end thereof to which the resins are supplied and a terminating end section defined on the end thereof from which the resins are supplied to said T-die, said joining of said auxiliary resin occurring at the terminating end section of said feed block after said inner and outer layers have been laid up one on the other so that said lateral edges of the multi-layer resin material are defined before entering the T-die and are made substantially of a single resin.

2. A method according to claim 1, wherein an adhesive resin is supplied to the zone between the inner and outer layers of the multi-layer resin material.

3. A method according to claim 1, wherein the resin for the inner layer is selected from the group consisting of ethylene-vinyl alcohol copolymer, polyvinylidene chloride, polyvinyl chloride, polyvinyl chloridevinylidene chloride copolymer, polyvinyl alcohol, polyamide resin and polyacrylonitrile resin.

4. A method according to claim 1, wherein the resin for the outer layer is selected from the group consisting of polypropylene, polyethylene, ethylene-α-olefin copolymer and mixtures thereof.

5. A method according to claim 1, wherein at least one material selected from the group consisting of fillers, oxidation inhibitors, ultraviolet absorbers, antistatic agents, lubricants and coloring agents is added to at least one of the resins for the inner and outer layers.

6. A method according to claim 2, wherein said adhesive resin is selected from the group consisting of ionomers and polyolefins modified with a polymerizable unsaturated carboxylic acid or a derivative thereof.

7. A method according to claim 1, wherein said inner and outer layers are formed within said feed block into a multilayer structure having a circular cross-section, and wherein the feed rate of the auxiliary resin is controlled so that the width of the circular-shaped multilayer structure is increased.

8. A method according to claim 7, wherein the auxiliary resin is introduced through the same flow path as for the resin for the outer layer, and the feed rate of said auxiliary resin is controlled independently of the respective feed rates of the resins for said inner and outer layers.

9. A coextrusion process, which comprises the steps of: continuously laying up in a feed block streams of molten, first and second, different polymers to form a first continuous multi-layer structure in which said first polymer forms an intermediate middle layer and the opposite surfaces of said middle layer are covered by outer layers of said second polymer, the opposite lateral edges of said middle layer and said outer layers of said first multi-layer structure being uncovered and exposed; then continuously laying up through the same flow path used for said second polymer in the feed block continuous streams of molten third polymer on the opposite exposed, lateral edges of said middle and outer layers, whereby to cover said exposed edges with lateral layers of said third polymer and to form a second continuous multi-layer structure, said third polymer being identical to or compatible with said second polymer; then extruding said second continuous multi-layer structure through an extrusion die to form a sheet or film in which said middle and outer layers are of uniform thickness over the entire width of the sheet or film and said third polymer forms the lateral edge portions of the sheet or film.

10. A coextrusion process as claimed in claim 9, in which said first and second multi-layer structures are of elliptical cross-section with said middle layer being flat in cross-section and said outer layers forming segments of arcuate cross-section which are disposed on opposite sides of said flat middle section along the major axis of the ellipse, and in said second multilayer structure said lateral layers cover two separate portions disposed on opposite sides of the major axis of the ellipse and the remaining central regions of said outer layers are uncovered and exposed, said lateral layers being of greatest thickness in the central regions thereof which cover the lateral ends of said middle layer, the thickness of said lateral layers progressively diminishing from said central region to the opposite edges thereof.

* * * * *